US007917935B2

(12) United States Patent
McAlpine et al.

(10) Patent No.: US 7,917,935 B2
(45) Date of Patent: Mar. 29, 2011

(54) MECHANICAL PAN, TILT AND ZOOM IN A WEBCAM

(75) Inventors: Paul McAlpine, Fremont, CA (US); Olivier Lechnenne, Fremont, CA (US); Venkatesh Tumati Krishnan, San Jose, CA (US); Patrick Miauton, Mountain View, CA (US); Remy Zimmermann, Belmont, CA (US); Yuh-Lin Chang, Fremont, CA (US)

(73) Assignee: Logitech Europe S.A. (CH)

( * ) Notice: Subject to any disclaimer, the term of this patent is extended or adjusted under 35 U.S.C. 154(b) by 885 days.

(21) Appl. No.: 10/956,737

(22) Filed: Oct. 1, 2004

(65) Prior Publication Data

US 2006/0075448 A1     Apr. 6, 2006

(51) Int. Cl.
*H04N 7/173* (2006.01)
(52) U.S. Cl. ......................................................... 725/105
(58) Field of Classification Search ........................ None
See application file for complete search history.

(56) References Cited

U.S. PATENT DOCUMENTS

| | | | |
|---|---|---|---|
| 4,348,097 A * | 9/1982 | Sippel | 396/428 |
| 5,057,859 A | 10/1991 | Ishimaru | |
| 5,239,330 A | 8/1993 | Uenaka | |
| 5,298,933 A | 3/1994 | Chigira | |
| 5,334,917 A | 8/1994 | Lind | |
| 5,389,967 A * | 2/1995 | Kim | 348/169 |
| 5,572,317 A | 11/1996 | Parker et al. | |
| 5,598,209 A * | 1/1997 | Cortjens et al. | 348/211.12 |
| 5,614,982 A | 3/1997 | Yasukawa | |
| 5,627,616 A | 5/1997 | Sergeant et al. | |
| 5,652,928 A | 7/1997 | Baxter et al. | |
| 5,754,225 A | 5/1998 | Naganuma | |
| 5,802,412 A | 9/1998 | Kahn | |
| 5,864,363 A * | 1/1999 | Giefing et al. | 348/143 |
| 5,893,651 A | 4/1999 | Sakamoto | |
| 6,297,846 B1 * | 10/2001 | Edanami | 348/239 |
| 6,593,956 B1 | 7/2003 | Potts et al. | |

(Continued)

FOREIGN PATENT DOCUMENTS

CN    1254904    5/2000

(Continued)

OTHER PUBLICATIONS

"Logitech QuickCam Sphere Stands Above the Crowd, Follows Every Move with Mechanical Pan and Tilt"; Press release, Logitech, Oct. 31, 2003, searched on the internet on Oct. 26, 2007, http://www.logitech.com/index.cfm/172/1705&cl=de,de.

(Continued)

*Primary Examiner* — Nhon T Diep
(74) *Attorney, Agent, or Firm* — Kilpatrick Townsend & Stockton

(57) ABSTRACT

A system and method for mechanically panning, tilting, and/or zooming a webcam to track a user's face. In one embodiment, such movement is controlled by kernel software in a host to which the webcam sends video data. In this way, a driver in the host kernel handles the face tracking, transparent to the application programs that would access the video. In an alternate embodiment, such movement is controlled by firmware in the webcam itself. The video and control signals are sent over the same standard cable, such as a USB bus. In one embodiment, the video is supplied to an instant messaging application. The use of a standard bus (e.g., USB) and the offloading of the face tracking to the webcam and driver allows easy use by the instant messaging application.

6 Claims, 7 Drawing Sheets

U.S. PATENT DOCUMENTS

| | | | |
|---|---|---|---|
| 6,606,458 B2 * | 8/2003 | Umeda et al. | 396/110 |
| 6,680,745 B2 * | 1/2004 | Center et al. | 348/14.16 |
| 6,879,709 B2 * | 4/2005 | Tian et al. | 382/118 |
| 7,473,040 B2 | 1/2009 | Kenoyer et al. | |
| 2001/0007472 A1 | 7/2001 | Nishimura | |
| 2002/0113862 A1 | 8/2002 | Center, Jr. et al. | |
| 2002/0140308 A1 | 10/2002 | Inayama et al. | |
| 2003/0133599 A1 * | 7/2003 | Tian et al. | 382/118 |
| 2003/0163289 A1 * | 8/2003 | Whelan et al. | 702/188 |
| 2005/0057656 A1 | 3/2005 | Chardon et al. | |
| 2005/0168574 A1 * | 8/2005 | Lipton et al. | 348/143 |

FOREIGN PATENT DOCUMENTS

| | | |
|---|---|---|
| DE | 102004044151 A1 | 9/2004 |
| GB | 2343945 A | 5/2000 |
| JP | 58103891 A | 6/1983 |
| WO | WO 99/60788 A1 | 11/1999 |

OTHER PUBLICATIONS

"Logitech QuickCam Sphere Stands Above the Crowd, Follows Every Move with Mechanical Pan and Tilt," Press Release, Logitech, Oct. 31, 2003, searched on the internet Feb. 6, 2009, http://www.logitech.com/index.cfm/172/1705&cl=roeu,en.

Office Action for U.S. Appl. No. 10/871,139 dated Nov. 26, 2008, 10 pages.

Office Action for U.S. Appl. No. 10/871,139 dated Jun. 10, 2009, 12 pages.

Final Office Action for U.S. Appl. No. 10/871,139 mailed on Mar. 1, 2010; 13 pages.

Non-Final Office Action for U.S. Appl. No. 10/871,139 mailed on Jun. 10, 2009; 13 pages.

* cited by examiner

MECHANICAL PAN, TILT AND ZOOM IN A WEBCAM

CROSS-REFERENCES TO RELATED APPLICATIONS

This application is related to co-pending application Ser. No. 10/871,139, which is entitled "Pan and Tilt Camera" and which was filed on Jun. 18, 2004, and is hereby incorporated herein in its entirety.

BACKGROUND OF THE INVENTION

1. Field of the Invention

This invention relates generally to panning, tilting, and zooming in webcams, and more particularly, to the mechanical panning, tilting and zooming of video webcams controlled by software or firmware.

2. Description of the Related Art

Over the past few years, electronic contact between people has increased tremendously. Various modes of communication are used to electronically communicate with each other, such as video conferencing, emails, text messaging, etc. In particular, Instant Messaging (IM), which permits people to communicate with each other over the Internet in real time ("IM chats"), has become increasingly popular. More recently, video data is also being transmitted in conjunction with real time IM chats.

Several cameras exist which can be used for such electronic video communication. Some such cameras have the ability to capture still image data in addition to video data and audio data. For purposes of video real time chats, these cameras are often connected to a user's computer, and the video and/or audio data captured by the camera is transmitted to the computer. As mentioned above, several other applications may exist, where still image, video and/or audio data is transmitted, such as live video streaming, video capture for purposes of creating movies, video surveillance, internet surveillance, internet webcams, etc.

In such applications, seeing the face of the other user is often of paramount importance. For instance, in a case where two users are communicating using video IM, it is often desired that the impression of actually chatting with the other user is created. Thus seeing each other's faces greatly enhances this experience. It is, however, natural for people to move their faces from side to side, or up and down etc., and thus completely or partially disappear from the field of view of the camera. In such applications, it is thus often very important to track the face of the user.

However, most conventional cameras used for instant messaging (often webcams) do not move automatically to track a user's face. The user has to specifically move the camera by hand to re-enter the field of view, or has to consciously move his or her face back into the field of view of the camera. In some cases, optical face tracking has been implemented. One such camera which implements optical face tracking is the QuickCam Pro 4000® from Logitech, Inc. (Fremont, Calif.). As an example of how optical tracking may work, consider that the user's face moves to the top right corner of the field of view of the camera. The software associated with the camera may recognize this movement of the user's face, zoom in to the face, crop the image data around the face, and then resize the image being transmitted.

Optical face tracking has several limitations. First, the quality of such optically processing image data is significantly degraded. Second, the field of view of the camera is unchanged by such optical processing. Thus if the user were to move enough to go out of the current field of view of the camera, optical face tracking cannot compensate for this. U.S. Pat. No. 6,297,846 uses a wide angle lens, and from the wide angle image, follows people and chooses a window within the wide angle image.

Another solution is proposed in U.S. Pat. No. 5,598,209, entitled "Method for automatically adjusting a video conferencing system camera." The patent discusses provides alternative methods of adjusting the pan, tilt, zoom and focus of a camera. However, the disclosed methods require specific input from the user regarding which object or which specific position around which the field of view of the camera should be centered. The panning, tilting, etc. is not automatic, based on tracking the face of the user.

Some patents describe still picture framing systems, and others use ranging systems to adjust to the distance by zooming. U.S. Pat. Nos. 6,606,458 and 5,864,363 describe automatic alignment of a person's face for a camera portrait, but do not provide continuous tracking for video. U.S. Pat. No. 5,389,967 shows tracking an object with a camcorder, but using an infrared signal. U.S. Pat. No. 4,348,097 shows a camera mounted on a track, with a distance gauge used to control movement of the camera to maintain a desired distance from an object.

U.S. Pat. No. 6,680,745 teaches multiple cameras for a video conference, with one wide angle camera detecting movement of people, and then directing the zoom, pan and tilt of other cameras. A similar system, with one camera controlling others, is shown in US published application no. 20020113862, which shows a wide angle camera, connected to a USB, controlling other cameras to follow faces. Some systems use sounds (the person talking) to locate a person who has moved out of a camera's range. Typically, a special video conferencing board is used, with a first cable providing the video input, and other cables providing the outgoing control to the cameras.

BRIEF SUMMARY OF THE INVENTION

The present invention is a system and method for automatically mechanically panning, tilting, and/or zooming a webcam to track a user's face. In one embodiment, such movement is controlled by kernel software in a host to which the webcam sends video data. In this way, a driver in the host kernel handles the face tracking, transparent to the application programs that would access the video. In an alternate embodiment, such movement is controlled by firmware in the webcam itself. The video and control signals are sent over the same standard cable, such as a USB bus.

In one embodiment, the video is supplied to an instant messaging application. The use of a standard bus (e.g., USB) and the offloading of the face tracking to the webcam and driver allows easy use by the instant messaging application.

In one embodiment, a machine vision algorithm localizes the user's face in the webcam's current field of view. The webcam is moved based on positive localization of the face and its facial features. In one embodiment of the present invention, an algorithm is used to compare this location of the user's face to the current field of view of the webcam. If it is determined that the user's face is too close to the edge of the field of view (based on a specified threshold), the lens of the webcam is moved appropriately. A video webcam in accordance with such an embodiment of the present invention is equipped with mechanical actuators that move the webcam lens up or down (tilt) or left and right (pan). In another embodiment, mechanical actuators also exist to move the webcam lens in or out (zoom). In one embodiment, the processing to track the face is done in the webcam itself, eliminating the need for a host system to do this processing.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

Figure 1:
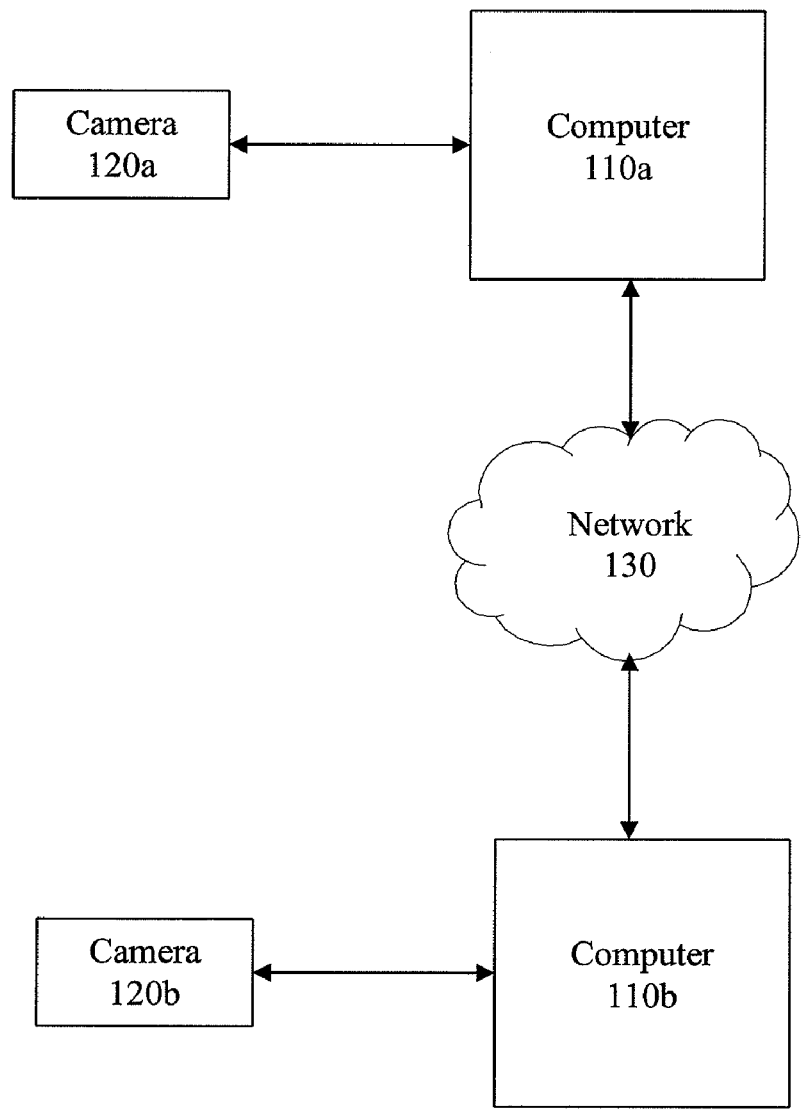
FIG. 1 is a block diagram of one embodiment of a system 100 for video communication

FIG. 1 is a block diagram of one embodiment of a system 100 for video communication. System 100 comprises computer systems 110a and 110b, webcams 120a and 120b, and network 130. A user using computer 110a and webcam 120a can communicate with a user using computer 110b and webcam 120b over the network 130.

The computer 110a or 110b could be any host which is able to communicate with the webcam 120a or 120b, and/or the network 130. Thus the computer 110 or 110b could be a personal computer (desktop or laptop), a handheld computer or organizer (such as a Personal Digital Assistant (PDA)), a cellular phone, an embedded automotive solution capable of interfacing with webcam and/or network, and so on. In one embodiment, the computers 110a and 110b are part of conventional computer systems, that may each include a storage device, a network services connection, and conventional input/output devices such as, a display, a mouse, a printer, and/or a keyboard, that may couple to a computer system. The computer 110a or 110b also includes a conventional operating system (such as MS Windows, Mac OSX operating system, etc.), input/output device, and network services software. In addition, in one embodiment, the computer 110a or 110b includes IM software, such as ICQ from ICQ, Inc., America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.).

The network service connection includes those hardware and software components that allow for connecting to a conventional network service. For example, the network service connection may include a connection to a telecommunications line (e.g., a dial-up, digital subscriber line ("DSL"), a T1, or a T3 communication line). The host computer, the storage device, and the network services connection, may be available from, for example, IBM Corporation (Armonk, N.Y.), Sun Microsystems, Inc. (Palo Alto, Calif.), or Hewlett-Packard, Inc. (Palo Alto, Calif.).

Webcams 120a and 120b are connected to the computers 110a and 110b respectively. Webcams 120a and 120b can be any cameras connectable to computers 110a and 110b. In one embodiment, webcams 120a and/or 120b are QuickCam® cameras from Logitech, Inc. (Fremont, Calif.).

The network 130 can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 120 may also include commercially available subscription-based services such as, for example, AOL from America Online, Inc. (Dulles, Va.) or MSN from Microsoft Corporation (Redmond, Wash.).

Figure 2A:
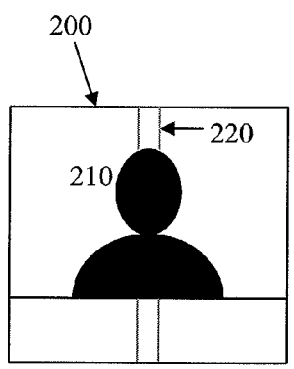
FIGS. 2A, 2B, and 2C illustrate the movement of a user's head, and the movement of the webcam to account for such motion.
Figure 2B:
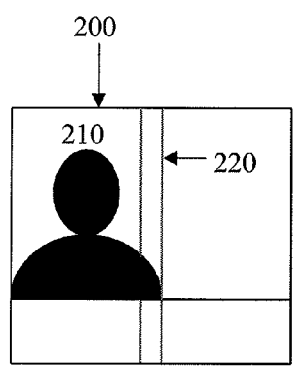
Figure 2C:
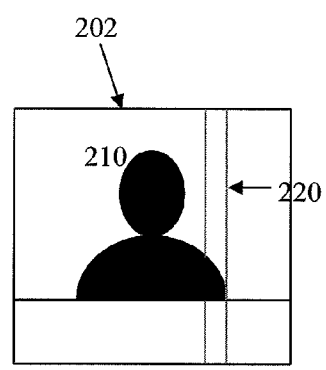

FIGS. 2A, 2B and 2C provide an example of the functioning of an embodiment of the present invention. FIGS. 2A, 2B and 2C illustrate a field of view of the webcam 120a (200 in FIGS. 2A and 2B, and 202 in FIG. 2C), the head of a user/speaker 210, and a stationary background feature 220, denoted by two vertical lines.

In FIG. 2A, the speaker's head 210 is in the center of the field of view 200 of the webcam 120a. It can be seen from FIG. 2A that the stationary background feature 220 is behind the speaker's head at this time, and is thus also in the center of the field of view 200 of the webcam 120a.

Let us assume that the speaker then moves to the left. FIG. 2B illustrates that the speaker's head 210 moves to the left of the field of view 200 of the webcam 120a. The stationary background feature 220 is still at the center of the field of view 200 of the webcam 120a.

FIG. 2C illustrates how a system in accordance with an embodiment of the present invention will accommodate this movement by the speaker. In one embodiment, the system detects that the speaker's head 210 is too close to the edge of the camera's current field of view 200. The lens of the camera then moves and changes its field of view, so that the speaker's head 200 is in the center of its new field of view 202. It can be seen that the background feature 220, being stationary, is no longer in the center of the new field of view 202.

It is to be noted that since the webcam 120a can modify its field of view to accommodate movements by the speaker, the effective field of view of the webcam 120a is significantly larger than that of conventional cameras. It is also to be noted that in the above example, the speaker moved from right to left. In one embodiment, the same accommodation by movement of the lens would take place even if the speaker moved in other directions (such as left to right, up to down, down to up, or a combination of these). In one embodiment, the field of view is automatically adjusted (i.e. it zooms outs and zooms in when the speaker moves closer to the camera or further away from the camera respectively), so as to maintain the same size of the speaker's head in relation to the field of view of the camera. In one embodiment, the automatic adjustment of the field of view can be achieved by zooming the lens on the webcam. In another embodiment, the automatic adjustment of the field of view can be achieved using electronic zoom (on the webcam itself or on the host computer).

Figure 3:
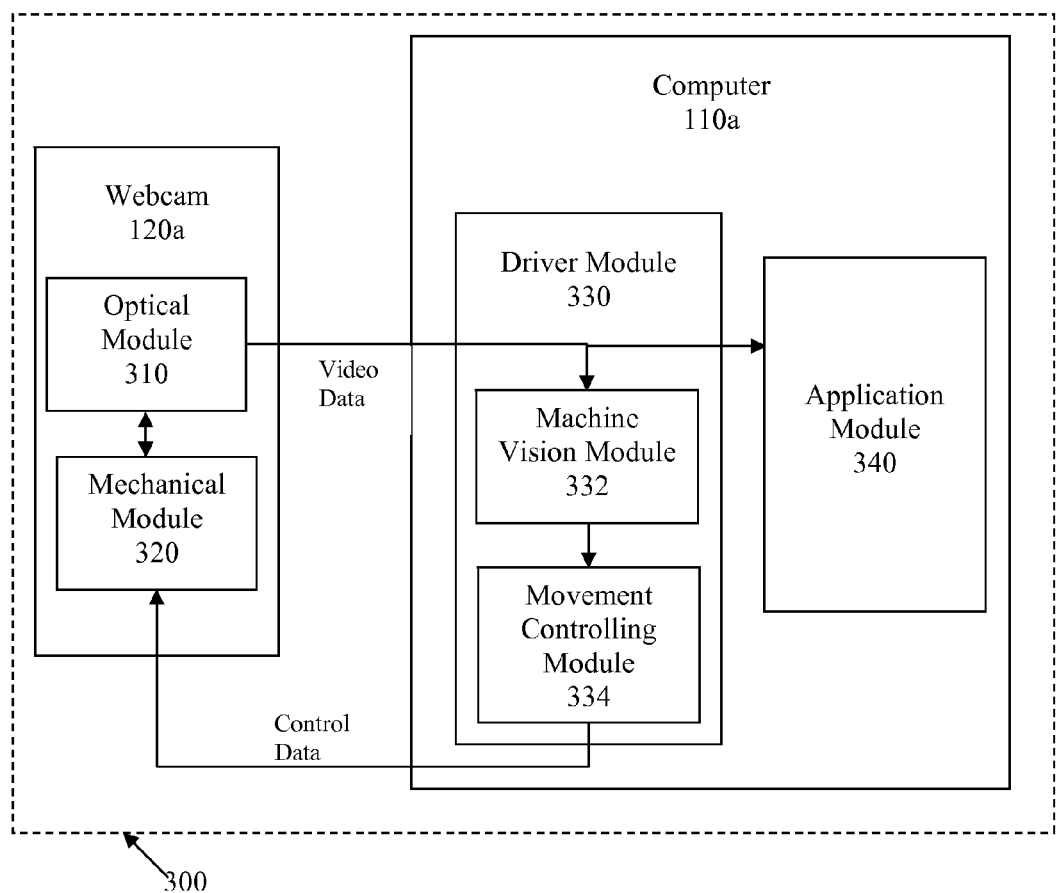
FIG. 3 is a block diagram of a system in accordance with an embodiment of the present invention.

FIG. 3 is a block diagram of a system in accordance with an embodiment of the present invention. System 300 comprises the webcam 120a and the computer 110a.

The webcam 120a is comprised of an optical module 310 and a mechanical module 320. In one embodiment, the optical module 310 comprises of the lens, sensor, and firmware that allows video processing and compression. The mechanical module 320 includes the mechanics for moving the lens. In one embodiment, actuators are used for moving the lens. In one embodiment, the actuators cause the mechanical lens displacement it either direction through a gearbox that translates the actuator revolutions into webcam motion. In one embodiment, two actuators and two gearboxes are used, and each actuator controls one gearbox. Once the decision is made to move the lens mechanically, the webcam's firmware (software embedded in the webcam itself) is ordered to do so. The firmware sends signals to the actuators which in turn move the gearboxes, which in turn moves the webcam and/or its lens.

The software on the computer 110a includes a driver module 330 and an application module 340. The driver module 330a includes a Machine Vision Module 332, and a Decision Making Module 335. The Machine Vision Module 332 tracks the location of the face of the speaker within the field of view of the webcam 120a, and is further described below with reference to FIG. 5. Based on output from the Machine Vision Module 332, the Movement Controlling Module 334 decides whether, and how much, to move the camera. The Movement Controlling Module 334 is further described below with reference to FIG. 6. The application module 340 is the application that the user interacts with when using the webcam 120a.

Figure 4:
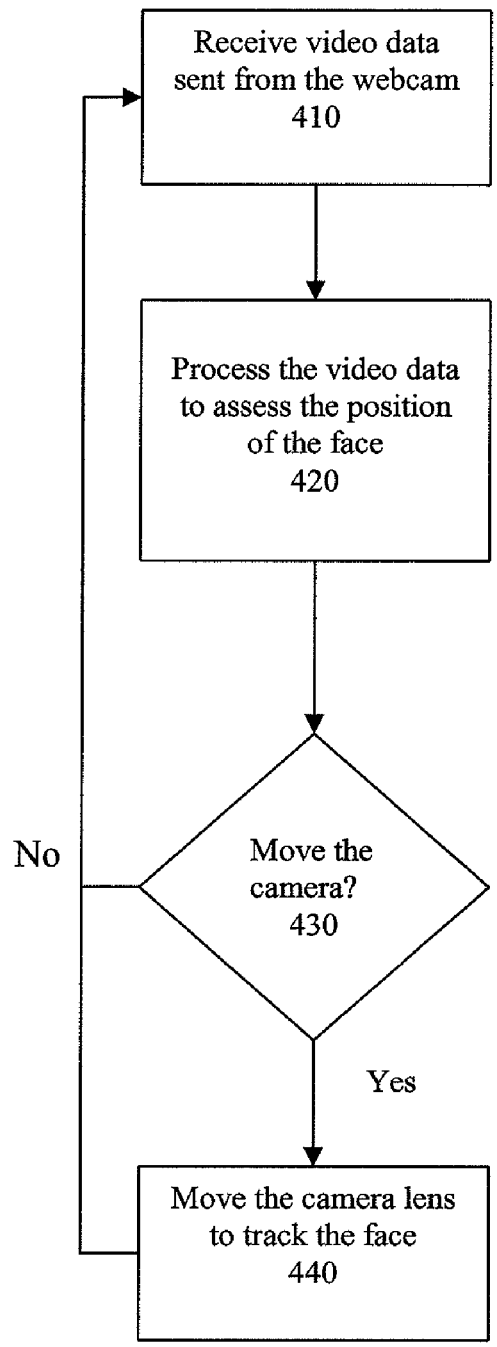
FIG. 4 is a flowchart illustrating the functioning of a system in accordance with an embodiment of the present invention.

FIG. 4 is a flowchart illustrating the functioning of system 300. Video data sent from the webcam 120a is received (step 410) by the computer 110a. The video data is then processed (step 420) to assess the position of the user's face in the frame. The machine vision module 332, which is described below with reference to FIG. 5, performs this processing.

Figure 5:
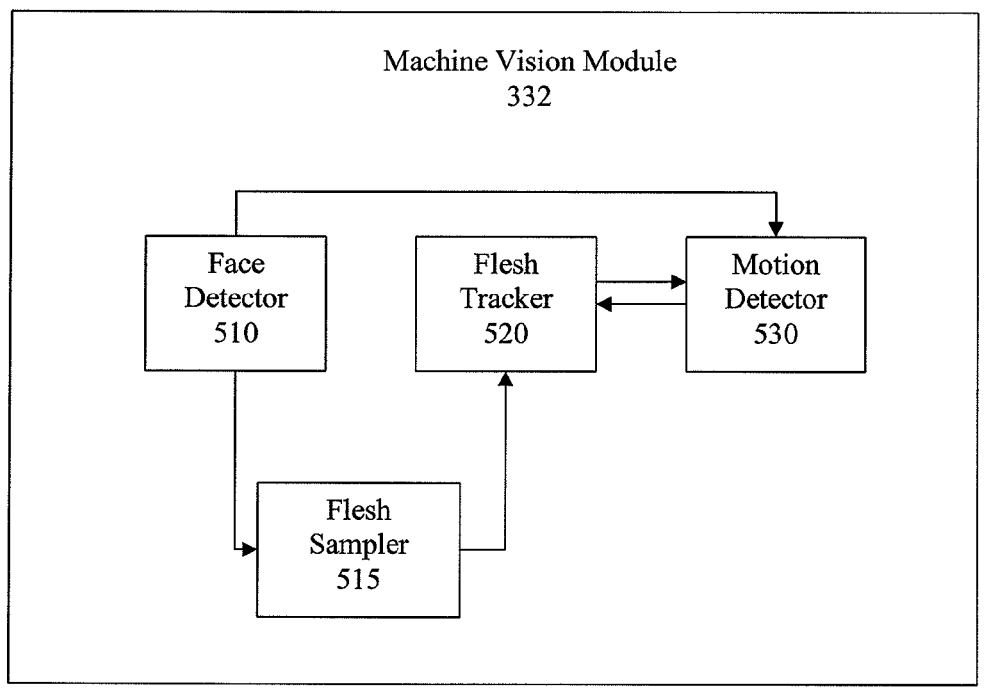
FIG. 5 is a block diagram of a machine vision module in accordance with an embodiment of the present invention.

FIG. 5 is a block diagram of a Machine Vision Module 332 in accordance with an embodiment of the present invention.

The Machine Vision Module 332 includes a face detector 510, a flesh sampler 515, a flesh tracker 520, and a motion detector 530. The face detector 510, the flesh tracker 520, and the motion detector 530, each use different parameters to determine where a user's face may be located within the frame captured by the camera. The outputs of these modules affect each other, and together they provide an estimate of where the user's face is within the camera's field of view.

The face detector 510 detects the presence of a face based on certain parameters expected to be common to all human faces. These parameters might include, for example, the existence of two eyes, a nose, and a mouth, with a certain spacing ratio between them.

The output of the face detector 510 is then fed to the flesh sampler 515. The flesh sampler selects a particularly smooth area from the "face" as determined by the face detector 510. For instance, this area may be an area from the forehead of the user. This area is then used as a sample of the user's flesh. Using a sample of the user's face eliminates differences in flesh tone across different users, as well as any differences in flesh tones due to the lighting in the user's environment. The output of the flesh sampler 515 is provided to the flesh tracker 520. The flesh tracker 520 then uses the sample of flesh sampler 515, and tracks the user's face by tracking the user's flesh as it moves.

The motion detector 530 detects motion. When the user moves his/her head, the motion detector 530 is able to identify that motion. The motion detector 530 also receives information from the face detector 510 and the flesh tracker 520. Thus these three modules work in conjunction to identify something that has the parameters of a human face, has flesh tones, and which is moving. Thus, the machine vision module 332 can "see" the user's face in the frame, relative to the field of view of the camera. In one embodiment, the output of the machine vision module is a rectangle within which the user's face is contained.

Figure 6:
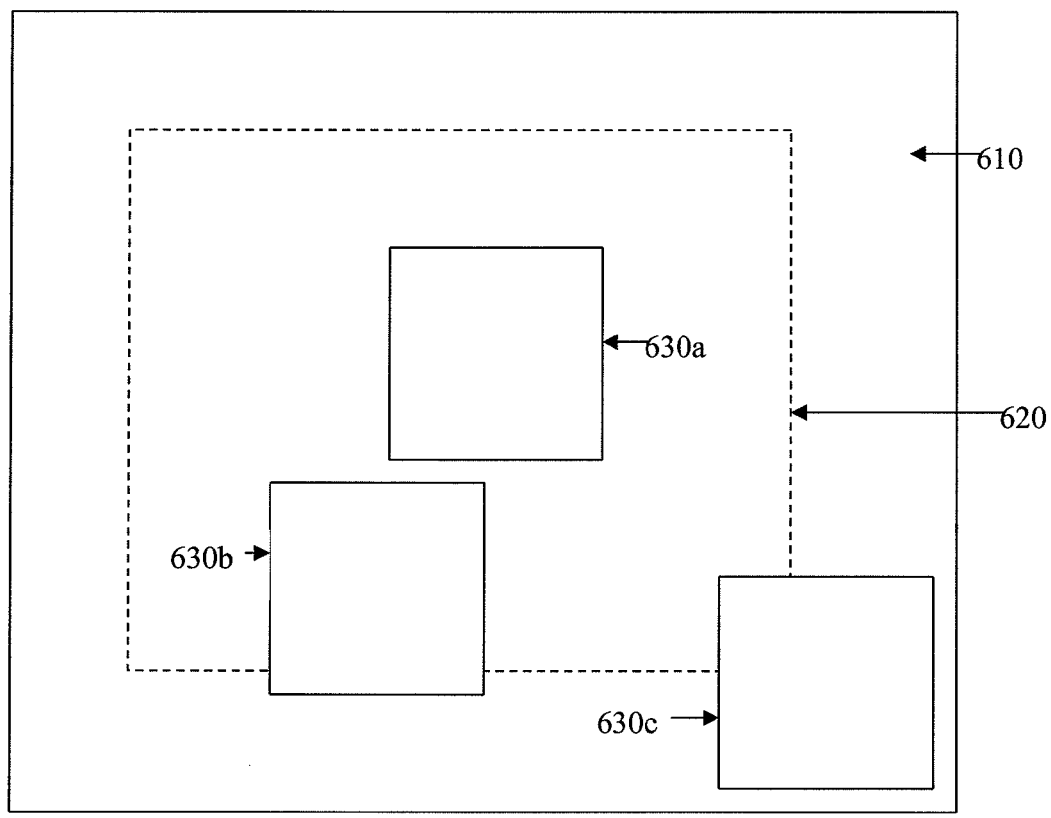
FIG. 6 is a block diagram illustrating the functioning of a movement controlling module in accordance with an embodiment of the present invention.

Referring again to FIG. 4, a decision is then made (step 430) regarding whether, and in which direction, the webcam lens should be moved. In one embodiment, the webcam lens is moved up-down, left-right, etc. by moving the webcam itself. In another embodiment, the webcam lens is moved without moving the housing of the webcam. In one embodiment, the decision to move the webcam lens (step 430) includes calculating the amount by which the lens should be moved. In another embodiment, the lens is moved by a predetermined amount in the specified direction. In one embodiment, the decision is made (step 430) by determining whether the user's face is outside of a threshold in the frame. FIG. 6 illustrates this in some detail.

FIG. 6 is a block diagram which illustrates how a decision is made about whether to move the lens of the webcam, how much to move it by, and the direction in which to move it, in accordance with an embodiment of the present invention.

Rectangle 610 represents the current field of view of the webcam 120a. Rectangles 630a, b, and c represent the position of the face of the user. In one embodiment, rectangles 630a, b, and c are provided by the machine vision module 332. Rectangle 620 represents a predetermined threshold relative to the current field of view 610 of the webcam 120a. An algorithm relating the position of the face of the user (i.e. 630a, b, or c) to the threshold 620 determines whether, how much, and in what direction to move the lens. For instance, in one embodiment, the algorithm is that the lens need not be moved as long as the center of the rectangle representing the user's face 630 a, b, or c) is within the threshold rectangle 620. When the center of the rectangle representing the user's face 630 a, b, or c is outside the threshold rectangle 620, the lens is to be moved until the user's face 630 a, b, or c is once again inside the threshold rectangle.

It can be seen from FIG. 6 that using such an algorithm, no lens motion is needed when the user's head is in positions 630a and 630b. However, when the user's face is in position 630c, the lens needs to be moved both downwards and to the right.

Referring again to FIG. 4, it can be seen that if it is decided (step 430) that the camera should not be moved, the system continues to receive the video data (step 410) and process it (step 420). If it is decided that the webcam needs to be moved to track the face, the lens of the webcam is moved in the specified direction in the calculated or predetermined amount. The system continues to receive the video data (step 410) and process it (step 420).

It is to be noted that in an alternate embodiment, the machine vision module 332, and other related modules, are embedded in the webcam 120a itself, rather than being on the computer 110a. In one embodiment, the mechanical panning, tilting, and/or zooming of the camera is controlled by the webcam's firmware. In one embodiment, the machine vision module 332 and/or the movement controlling module 334 could be included in the camera itself, either in their entirety, or in part.

Figure 7:
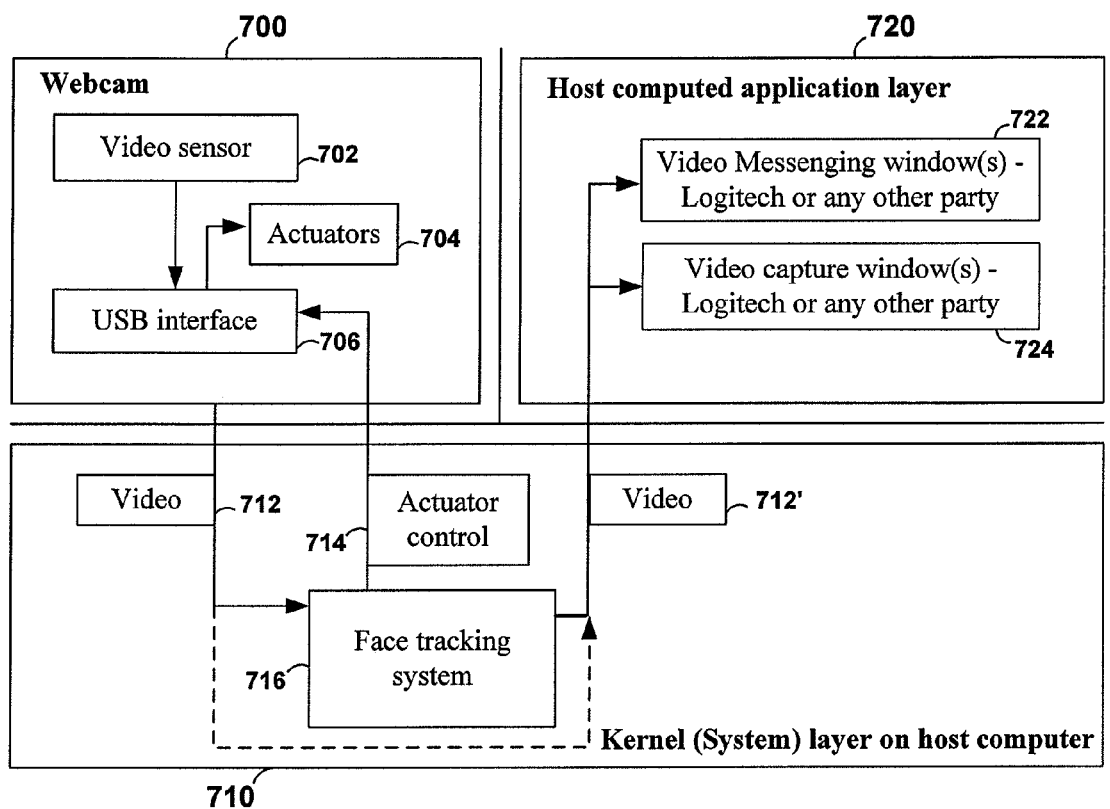
FIG. 7 is a block diagram illustrating the relationship between the webcam, host kernel layer (driver) and the application program.

FIG. 7 illustrates the relationship between the webcam, host kernel layer (driver) and the application program. A webcam 700 includes a video sensor 702 and actuators 704 for motorized control of the pan, tilt and zoom of the video sensor. A USB interface both provides the video signal 712 to the host, and receives actuator control commands 714 from the host for controlling the actuators. This allows a standard bus to be used for controlling the webcam.

In the host, a kernel layer 710 includes a driver with a face tracking system 716. This monitors the video 712, and provides actuator control signals transparent to the application program 720. The video signal 712 is also provided to the application program 720. The solid line represents the video path with face tracking, the dotted line represents the video path without face tracking. In the example shown, the application program is an instant messaging program. The instant messaging program has a messaging window 722 and a video capture window 724 for displaying the video 712. A button icon may be displayed in the messaging window for activating the face tracking feature.

While particular embodiments and applications of the present invention have been illustrated and described, it is to be understood that the invention is not limited to the precise construction and components disclosed herein. For example, as mentioned above, the present invention can be used with other applications that pull video from a webcam, not just instant messaging. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A system for mechanically moving an optical module in a webcam by tracking a user's face, the system comprising:
   an optical module in said webcam for capturing image data;
   a computer coupled via a bus to said webcam, with video data sent to the computer, and control signals sent from the computer to the webcam being both sent over the bus;
   computer readable media in said computer having computer readable instructions providing a driver, said driver including
      a machine vision module for:
         identifying the location of the user's face based on the captured image data,
         generating a boundary region within the field of view of the optical module, wherein the boundary region represents the location of a user's face, and wherein the boundary region is generated based on the location of the user's face identified in the identifying step,
         identifying a field of view of the optical module, and
         identifying a predetermined-threshold field of view smaller than the field of view of the optical module and larger than the boundary region; and
      a movement controlling module for:
         deciding to move the optical module to place the center of the boundary region inside the predetermined-threshold field of view if a center of the boundary region is outside of the predetermined-threshold field of view, and
         deciding not to move the optical module if the center of the boundary region is inside the predetermined-threshold field of view;
   a mechanical module in said webcam, communicatively coupled over said bus to the movement controlling module, for moving the optical module based on the decision of the movement controlling module; and
   computer readable media in said computer having computer readable instructions providing an application using said video data from said webcam, said application being independent of said driver.

2. The system of claim 1, wherein the image data from the webcam is provided to an instant messaging application.

3. The system of claim 1, wherein the machine vision module comprises:
   a face detector for detecting a user's face based on pre-specified parameters;
   a flesh tracker for tracking movement of a user's flesh based on flesh tone; and
   a motion detector coupled to the face detector and the flesh tracker for detecting motion of a user's face.

4. The system of claim 3, wherein the machine vision module further comprises:
   a flesh sampler coupled to the face detector, for extracting a sample of the user's flesh, and for providing this sample to the flesh tracker.

5. The system of claim 1 wherein said webcam is moved based on positive localization of facial features.

6. A system for mechanically moving an optical module in a webcam by tracking a user's face, the system comprising:
   a webcam comprising:
      an optical module for capturing video data; and
      a mechanical module coupled to the optical module, for moving the optical module;
   a standard bus connected to the webcam; and
   a computer coupled to the standard bus, the computer having a driver module comprising:
      a machine vision module coupled to the optical module, for:
         identifying the location of the user's face based on the captured video data;
         generating a boundary region within the field of view of the optical module, wherein the boundary region represents the location of a user's face, and wherein the boundary region is generated based on the location of the user's face identified in the identifying step,
         identifying a field of view of the optical module, and
         identifying a predetermined-threshold field of view smaller than the field of view of the optical module and larger than the boundary region; and
      a movement controlling module coupled to the machine vision module for:
         deciding to move the optical module to place the center of the boundary region inside the predetermined-threshold field of view if a center of the boundary region is outside of the predetermined-threshold field of view;
         deciding not to move the optical module if the center of the boundary region is inside the predetermined-threshold field of view, and providing the decision to the mechanical module,
   the computer also having an application module for a user to interact with the webcam via the computer, wherein the diver module is independent of the application module.

* * * * *